United States Patent [19]

Dubernard

[11] Patent Number: 5,322,339
[45] Date of Patent: Jun. 21, 1994

[54] GUIDING MECHANISM FOR A SLIDABLE ACCESS ELEMENT, SUCH AS A SLIDING DOOR, IN PARTICULAR FOR AUTOMOTIVE VEHICLE

[75] Inventor: Yves Dubernard, Saint Martin Des Champs, France

[73] Assignees: Automobiles Peugeot, Paris; Automobiles Citroen, Neuilly Sur Seine, both of France

[21] Appl. No.: 981,480

[22] Filed: Nov. 25, 1992

[30] Foreign Application Priority Data

Nov. 27, 1991 [FR] France ................... 91 14670

[51] Int. Cl.$^5$ ............................................. B60J 5/06
[52] U.S. Cl. ...................................... 296/155; 49/409
[58] Field of Search .................. 296/155; 49/213, 404, 49/409–413

[56] References Cited

U.S. PATENT DOCUMENTS

| | | | |
|---|---|---|---|
| 4,413,444 | 11/1983 | Chikaraishi | 49/409 |
| 4,433,507 | 2/1984 | Chikaraishi | 49/213 |
| 4,544,198 | 10/1985 | Ochiai et al. | 296/155 |
| 4,991,905 | 2/1991 | Watanabe et al. | 296/155 |

FOREIGN PATENT DOCUMENTS 0102053  3/1984  European Pat. Off. .
2080743  2/1982  United Kingdom .

*Primary Examiner*—David M. Mitchell
*Assistant Examiner*—Gary C. Hoge
*Attorney, Agent, or Firm*—Burns, Doane, Swecker & Mathis

[57] ABSTRACT

A guide mechanism for a slidable access element, such as a sliding door of an automotive vehicle, includes a slide mounted in a groove formed by a vehicle body stamping in proximity to a glass surface or the like. The groove is designed and dimensioned such that the glass surface rests on a gasket fastened to the body in the vicinity of an edge of the groove. The edge is located on the side of the glass surface. The glass surface extends past the gasket in the direction of the other edge of the groove until it covers approximately one half of the groove and the slide. The mechanism is particularly applicable to lateral sliding doors of vehicles.

8 Claims, 2 Drawing Sheets

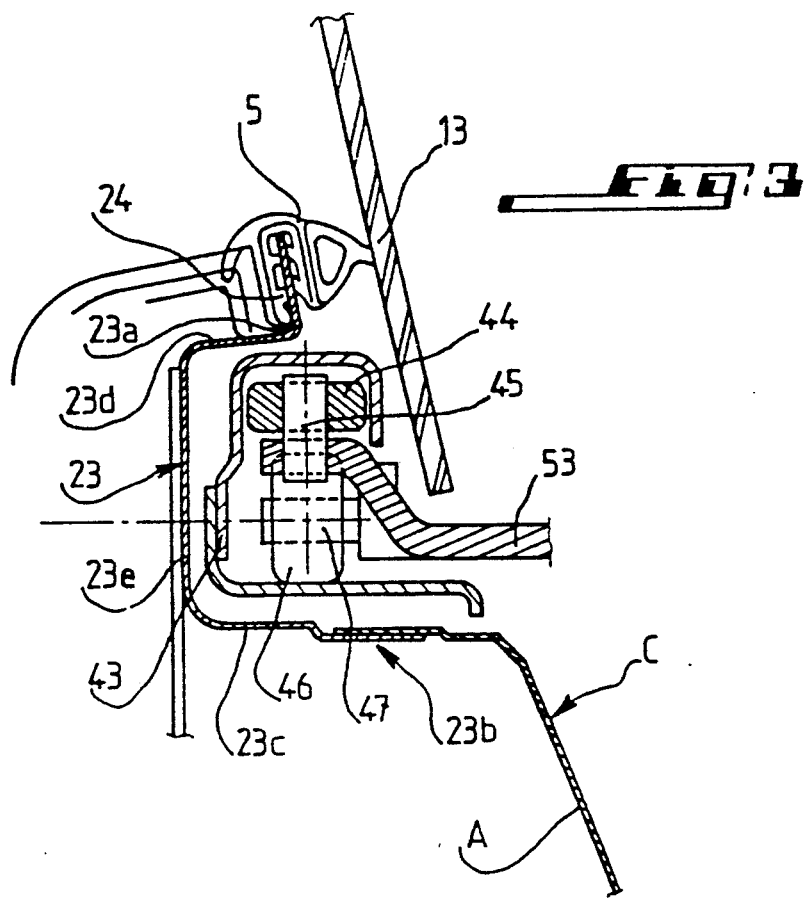
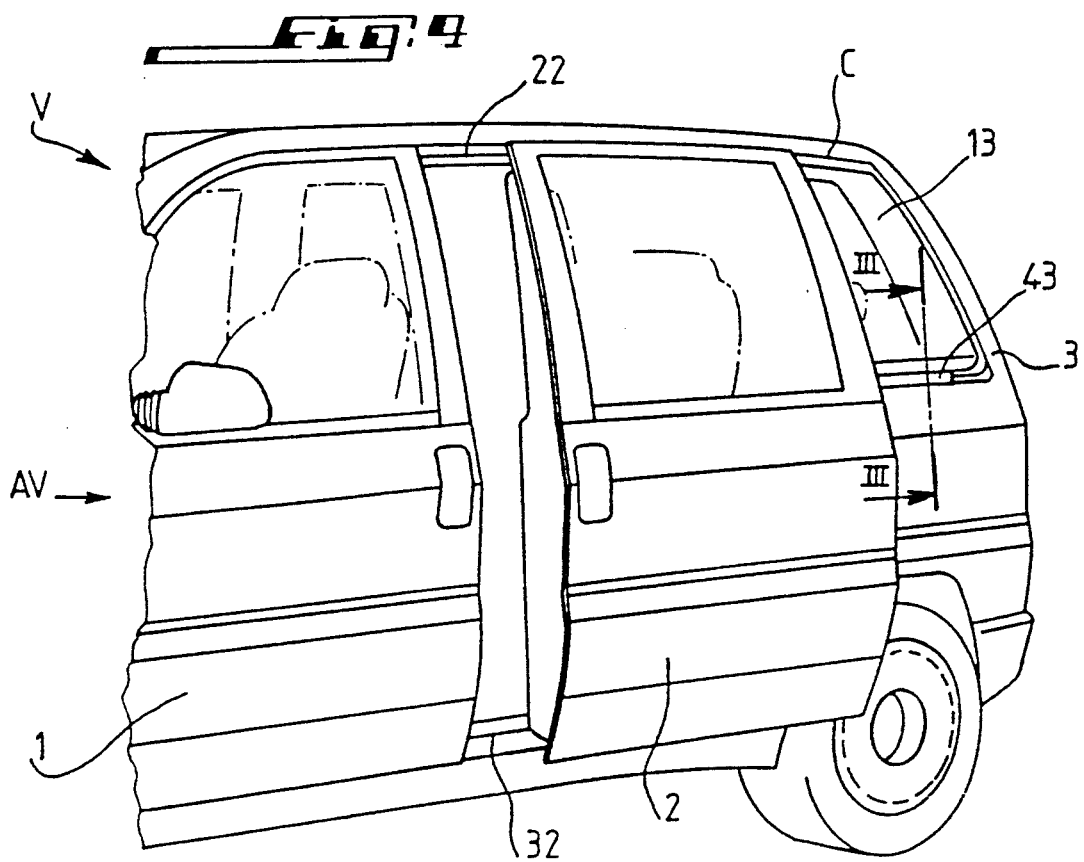

GUIDING MECHANISM FOR A SLIDABLE ACCESS ELEMENT, SUCH AS A SLIDING DOOR, IN PARTICULAR FOR AUTOMOTIVE VEHICLE

BACKGROUND OF THE INVENTION

The present invention generally concerns a slidable access element, such as a sliding door of an automotive vehicle. More particularly the invention deals with a guiding mechanism for use with such a slidable access element.

The systems used at the present time to provide guidance along a panel for sliding doors of an automobile vehicle, for example, a lateral rear door, such as that described in EP-102-053, principally comprise a longitudinal slide cooperating with rollers supported on the door, the slide being mounted in a protruding manner on the side of the vehicle. On the one hand, these systems are particularly exposed to impacts and are thus somewhat fragile. On the other hand, these systems represent a rupture in the continuity of the lateral surface of the vehicle, which affects its aesthetic appearance.

OBJECTS AND SUMMARY OF THE INVENTION

The present invention resolves these disadvantages and provide a guiding mechanism for the sliding cover of an opening, such as a sliding door for automotive vehicles, that has a simple design, operates reliably, and is particularly unobtrusive, since it is harmoniously integrated into the surface of the body of the vehicle so as to preserve a clear definition of the style of the vehicle.

An object of the present invention is to provide a guiding mechanism for a slidable access element, such as a sliding door of the automotive vehicle, of the type including a slide or the like. The mechanism includes a slide mounted in a horizontal groove of the vehicle body in the proximity to the lower edge of a glass surface fastened to the body. The slide cooperates with means supported by the slidable access element, the means being mobile along the slide during the displacement of the slidable access element between an open position and a closed position. The guiding mechanism includes a groove which is designed and dimensioned in a manner such that the glass surface rests on a gasket mounted on the body in the vicinity of an upper edge of the groove. The glass surface extends beyond the gasket so as to cover approximately the upper half of the groove and of the slide.

According to a particular feature of the invention, the aforementioned glass surface is connected with the body by means of hinges or the like, having essentially vertical axles located at the side of the slidable access element in the closed position.

According to another particular feature of the invention, the means supported by the slidable access element includes rollers capable of rolling along the guiding slide.

According to a further feature of the invention, the slidable access element is a lateral rear door of an automotive vehicle, while the glass surface is part of a rear lateral or side panel (or rear quarter) of the body of a vehicle.

Another object of the invention is to provide an automotive vehicle equipped with the guiding mechanism of a slidable access element having the features described above, taken alone or in combination.

BRIEF DESCRIPTION OF THE DRAWINGS

Other advantages and features of the invention will become more apparent to those skilled in the art when the following detailed description is read in conjunction with the illustrative drawings, wherein like reference numerals are applied to like elements and wherein:

FIG. 3 is a cross-sectional view on the line III—III of FIG. 4 showing the same part of the vehicle with the sliding door located in the vicinity of its maximum opened position; and FIG. 4 is a partial perspective view of the same vehicle, the sliding door being half open.

DETAILED DESCRIPTION OF THE PREFERRED EMBODIMENT

Figure 1:
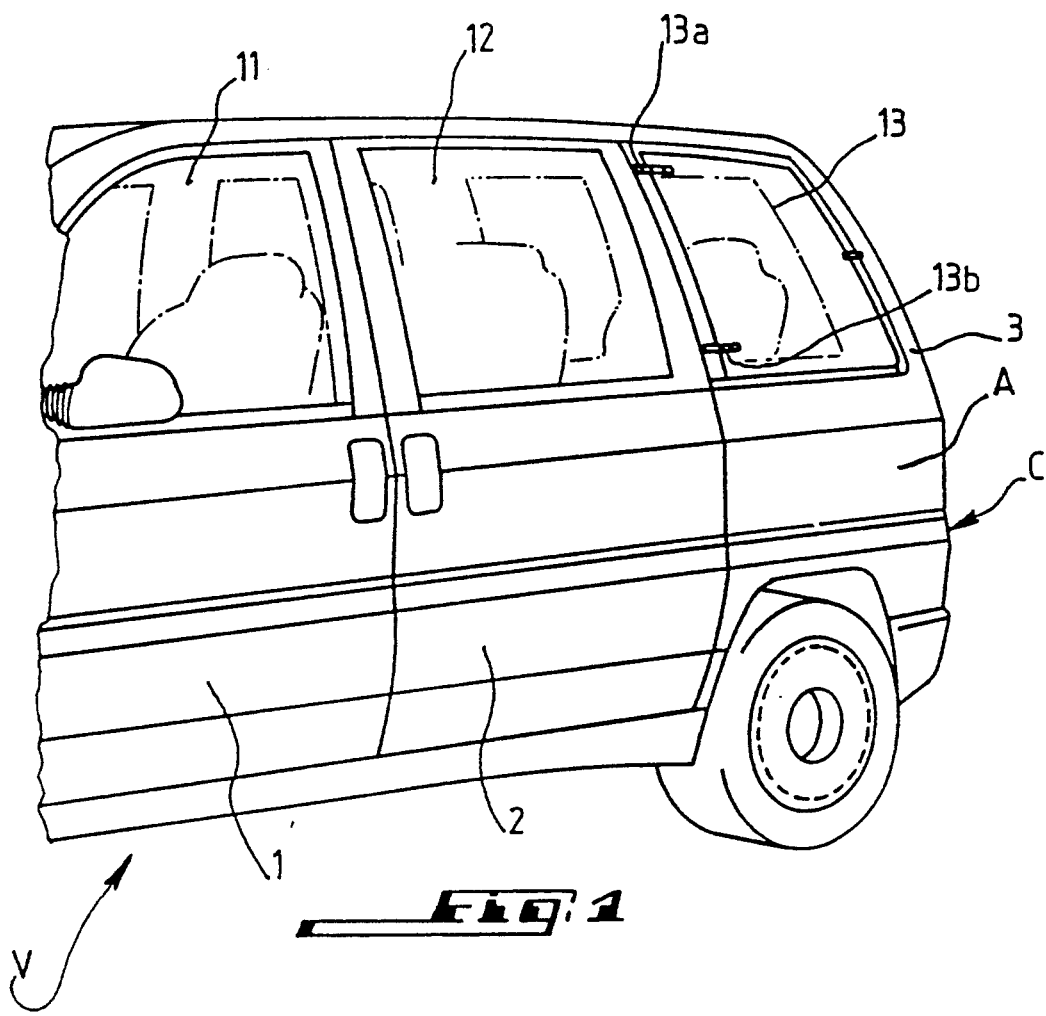
FIG. 1 is a partial descriptive view showing an automotive vehicle equipped with a guiding mechanism for a sliding door according to the present invention.

FIG. 1 shows an automotive vehicle V equipped with two articulated front doors 1 and two rear doors 2 each being slidable parallel to the longitudinal direction of the vehicle V along a corresponding one of the two lateral rear panels (or rear quarters) of the body C of the vehicle V. Each of the aforementioned doors 1, 2 includes a corresponding glass surface 11, 12. The rear quarter also includes a glass surface 13 that is supported in an articulated manner on the body C by means of two hinges 13a, 13b. The hinges 13a, 13b are located on the forward side of the glass surface 13 and make possible the pivoting of said glass surface 13 around an essentially vertical axis between a closed position and a half open position.

As seen more clearly in FIG. 4, each rear door 2 is slidable along three slides 22, 32, 43. The two slides 22, 32 are located on the upper and the lower parts of the opening of the rear door, respectively. The center rear slide 43 is positioned along the lower edge of the glass surface 13 of the rear quarter.

Figure 2:
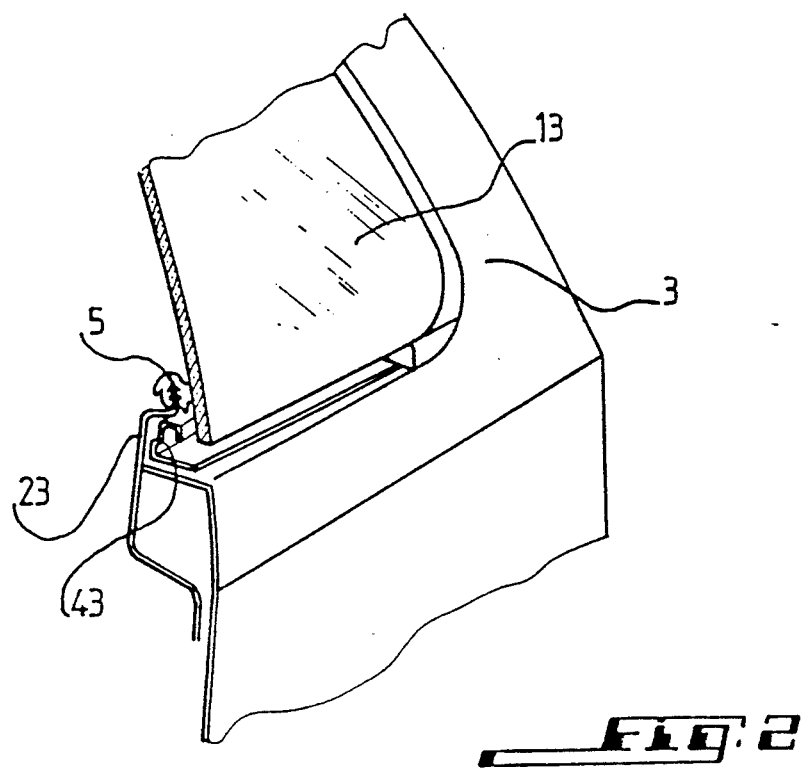
FIG. 2 is an enlarged view of FIG. 4, illustrating in perspective and in section, part of the lateral rear panel of the body of an automobile.

Referring to FIG. 2 and FIG. 3, it is seen that the mechanism of the invention to be placed in the vicinity of the glass of the rear quarter 13 includes the center slide 43 which is formed by two parts, an upper part and a lower part, both of which extend longitudinally along and parallel to the surface of the glass 13 essentially along its entire length. The slide 43 is mounted on a surface of the body C. The body surface is stamped in a manner such as to form a groove 23 having a C-shaped cross-section, the groove being delimited by a bottom wall 23e, an upper wall 23d, and a lower wall 23c. The lower wall 23c is connected with the rear wing A of the vehicle V. The upper and lower walls 23d, 23c are essentially perpendicular to the bottom wall 23e. The shape of the groove 23 is essentially that of the slide 43, having sufficient dimensions to enclose the slide.

The slide 43 cooperates, by means of its internal surface, with rollers 44, 46 rotatably mounted on corresponding axles 45, 47, that are generally perpendicular. The rollers 44, 46 are carried by a support part 53 integral with the door 2 so as to guide said door during its displacement along the rear lateral panel 3.

The glass 13 (which is pivotally mounted around an essentially vertical axis, as mentioned above) rests with its face located on the side of the body, and against a gasket 5 fastened to a shoulder 24 of the body C located along an upturned portion 23a of the upper edge 23d of the groove 23. The glass 13 also extends toward the bottom (of the vehicle V) in the direction of the lower edge 23b of the groove 23, into the vicinity of the horizontal part of the support 53 integral with the door, while covering the upper half of the groove 23 and of the slide 43.

In operation, during movement of the sliding door 2 from its closed position wherein it uncovers the glass 13, to its open position wherein it partially covers the glass 13, the door simultaneously slides along the upper forward slide 22, lower forward slide 32 and the rear center slide 43, by means of the rollers 44, 46, which roll in said slides, while not causing any protruding part to appear on the surface of the side of the vehicle V.

Thus, according to the invention, a guiding mechanism for a slidable access element is obtained, rendering the presence of the slide or guide rail extremely nonobtrusive by harmoniously integrating it with the lower line of the glass surfaces of the vehicle, the system being even more reliable by virtue of its position outside the most vulnerable zones of the side of the vehicle.

It should be understood that the invention is not limited to the embodiment described and illustrated, which is given only as an example. It will be apparent to those skilled in the art that numerous modifications, variations, substitutions, and equivalents exist for features of the invention described above. Accordingly, it is expressly intended that all such modifications, variations, substitutions, and equivalents that fall within the spirit and scope of the invention as defined by the appended claims be embraced thereby.

What is claimed is:

1. A guide mechanism for a slidable access element, such as a sliding door of an automotive vehicle, comprising a slide mounted in a horizontal groove in the body of the vehicle in proximity to a lower edge of a glass surface fastened to the body, said slide cooperating with means supported by the slidable access element, said means being mobile along the slide during the displacement of the slidable access element between an open position and a closed position, the groove being designed and dimensioned in a manner such that the glass surface rests on a gasket mounted on the body in the vicinity of the upper edge of the groove, and extends beyond said gasket in the direction of the lower edge of the groove so as to cover approximately the upper half of the groove and the slide.

2. The guide mechanism according to claim 1, wherein the glass surface is attached to the body by means of hinges having an essentially vertical axis located on the side of the slidable access element in the closed position.

3. The guide mechanism according to claim 1, wherein the means supported by the slidable access element includes rollers capable of rolling in the slide.

4. The guide mechanism according to claim 1, wherein the slidable access element is a rear lateral door of the automotive vehicle, and wherein the glass surface is part of a rear lateral panel of an automotive vehicle.

5. A vehicle, comprising:
a body having a window opening, and a slidable access element with an open position and a closed position, the body including a generally horizontal lower edge portion adjacent the window opening formed as a groove;
a slide mounted in the groove, the groove being sized to substantially enclose the slide;
means attached to the slidable access element, movable along the slide during displacement of the slidable access element between the open and closed positions;
a gasket attached to an upper edge portion of the groove, adjacent the window opening; and
a transparent member covering the window opening, supported in part by the gasket, and extending downwardly over about one half of the groove and the slide.

6. The vehicle according to claim 5, wherein the transparent member is attached to the body by means of hinges having an essentially vertical axis located on the side of the slidable access element in the closed position.

7. The vehicle according to claim 5, wherein the means attached to the slidable access element includes rollers capable of rolling along in the slide.

8. The vehicle according to claim 5, wherein the slidable access element is a rear lateral door of the vehicle, and wherein the transparent member is part of a rear lateral panel of the vehicle.

* * * * *

REEXAMINATION CERTIFICATE (3890th)

United States Patent [19]
Dubernard

[11] B1 5,322,339
[45] Certificate Issued Oct. 5, 1999

[54] GUIDING MECHANISM FOR A SLIDABLE ACCESS ELEMENT, SUCH AS A SLIDING DOOR, IN PARTICULAR FOR AUTOMOTIVE VEHICLE

[75] Inventor: Yves Dubernard, Saint Martin Des Champs, France

[73] Assignee: Automobile Peugeot, Paris, France

Reexamination Request:
No. 90/004,952, Apr. 1, 1998

Reexamination Certificate for:
Patent No.: 5,322,339
Issued: Jun. 21, 1994
Appl. No.: 07/981,480
Filed: Nov. 25, 1992

[30] Foreign Application Priority Data
Nov. 27, 1991 [FR] France ................... 91 14670

[51] Int. Cl.⁶ .................................................. B60J 5/06
[52] U.S. Cl. .................................. 296/155; 49/409
[58] Field of Search ........................ 296/155; 49/213, 49/404, 409, 410, 411, 412, 413

[56] References Cited

FOREIGN PATENT DOCUMENTS

| 63-17113 | 1/1988 | Japan . |
| 2-33719 | 8/1988 | Japan . |
| 2-33720 | 8/1988 | Japan . |
| 1-68222 | 5/1989 | Japan . |

*Primary Examiner*—Gary C. Hoge

[57] ABSTRACT

A guide mechanism for a slidable access element, such as a sliding door of an automotive vehicle, includes a slide mounted in a groove formed by a vehicle body stamping in proximity to a glass surface or the like. The groove is designed and dimensioned such that the glass surface rests on a gasket fastened to the body in the vicinity of an edge of the groove. The edge is located on the side of the glass surface. The glass surface extends past the gasket in the direction of the other edge of the groove until it covers approximately one half of the groove and the slide. The mechanism is particularly applicable to lateral sliding doors of vehicles.

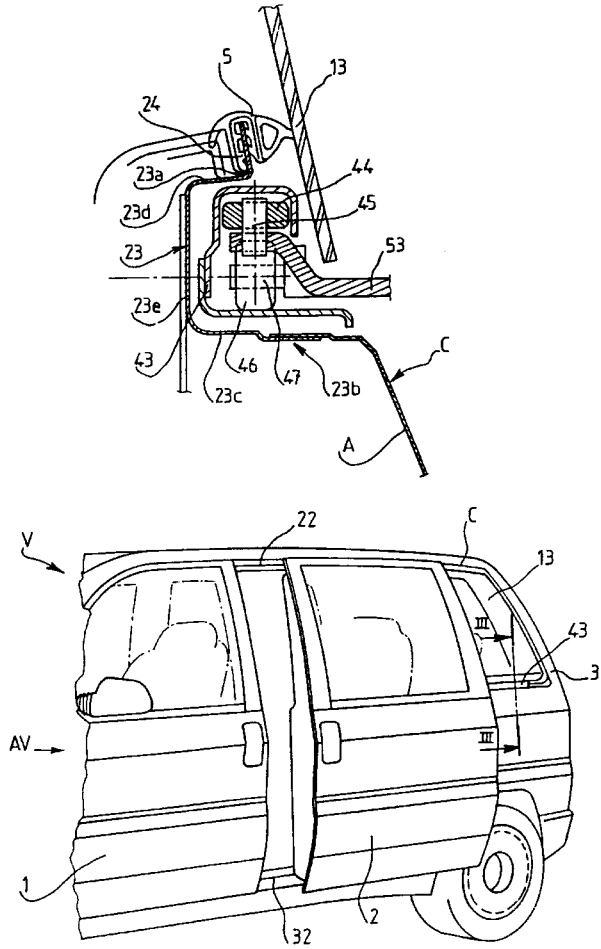

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 5 are determined to be patentable as amended.

Claims 2–4 and 6–8, dependent on an amended claim, are determined to be patentable.

1. A guide mechanism for a slidable access element, such as a sliding door of an automotive vehicle, comprising a slide mounted in a horizontal groove in the body of the vehicle in proximity to a lower edge of a glass surface fastened to the body *so as to be movable between open and closed window positions*, said slide cooperating with means supported by the slidable access element, said means being mobile along the slide during the displacement of the slidable access element between an open position and a closed position, the groove being designed and dimensioned in a manner such that the glass surface rests on a gasket mounted on the body in the vicinity of the upper edge of the groove, and extends beyond said gasket in the direction of the lower edge of the groove so as to cover approximately the upper half of the groove and the slide.

5. A vehicle comprising:

a body having a window opening, and a slidable access element with an open position and a closed position, the body including a generally horizontal lower edge portion adjacent the window opening formed as a groove;

a slide mounted in the groove, the groove being sized to substantially enclose the slide;

means attached to the slidable access element, movable along the slide during displacement of the slidable access element between the open and closed positions;

a gasket attached to an upper edge portion of the groove, adjacent the window opening; and a transparent member covering the window opening, *movable between open and closed window positions,* supported in part by the gasket, and extending downwardly over about one half of the groove and the slide.

* * * * *